US009894445B2

(12) United States Patent
Feldt

(10) Patent No.: US 9,894,445 B2
(45) Date of Patent: Feb. 13, 2018

(54) METHOD FOR OPERATING A HEARING DEVICE AND HEARING DEVICE

(71) Applicant: Sennheiser Communications A/S, Ballerup (DK)

(72) Inventor: Svend Feldt, Ballerup (DK)

(73) Assignee: SENNHEISER COMMUNICATIONS A/S, Ballerup (DK)

( * ) Notice: Subject to any disclaimer, the term of this patent is extended or adjusted under 35 U.S.C. 154(b) by 228 days.

(21) Appl. No.: 14/179,324

(22) Filed: Feb. 12, 2014

(65) Prior Publication Data

US 2014/0226830 A1 Aug. 14, 2014

Related U.S. Application Data

(60) Provisional application No. 61/764,008, filed on Feb. 13, 2013, provisional application No. 61/764,014, filed on Feb. 13, 2013.

(30) Foreign Application Priority Data

Feb. 13, 2013 (EP) .................................... 13155108
Feb. 13, 2013 (EP) .................................... 13155118

(51) Int. Cl.
*H04R 25/00* (2006.01)
*H04J 3/06* (2006.01)

(52) U.S. Cl.
CPC ........... *H04R 25/305* (2013.01); *H04R 25/30* (2013.01)

(58) Field of Classification Search
CPC ........ G06F 2205/061; G06F 5/06; G06F 5/12; G10L 19/00; G11B 20/10527; H03H 17/0628; H04J 3/0632; H04L 25/05; H04R 25/30
USPC .................. 341/61, 122, 123; 370/241, 516; 375/355, 371, 372; 381/60, 120; 700/94; 710/29, 52, 56, 60
See application file for complete search history.

(56) References Cited

U.S. PATENT DOCUMENTS 6,061,410 A * 5/2000 Linz ........................ H04L 25/05 341/123
6,092,126 A 7/2000 Rossum
8,006,007 B1 8/2011 Barkana
(Continued)

FOREIGN PATENT DOCUMENTS

DE 10 2009 008 092 A1 * 8/2010
DE 10 2009 008 092 A1 8/2010

*Primary Examiner* — Paul McCord
*Assistant Examiner* — Alexander Eljaiek
(74) *Attorney, Agent, or Firm* — Birch, Stewart, Kolasch & Birch, LLP

(57) ABSTRACT

A hearing device comprises a receiver, an input buffer and a sample processor, the receiver being adapted to receive samples of a digital audio signal and feed received samples as a digital input signal to the input buffer, the sample processor being adapted to process the buffered samples to provide samples of a digital output signal such that the digital output signal is a sample-rate converted representation of the digital input signal with a predetermined target sample rate. The hearing device further comprises a latency controller adapted to estimate the quality of reception of the digital audio signal and to control the processing of the buffered samples in dependence on the estimated quality of reception.

8 Claims, 7 Drawing Sheets

(56) References Cited

U.S. PATENT DOCUMENTS

| | | | | |
|---|---|---|---|---|
| 2004/0076190 | A1* | 4/2004 | Goel | H04J 3/0632 370/516 |
| 2007/0206645 | A1* | 9/2007 | Sundqvist | H04L 12/6418 370/516 |

* cited by examiner

METHOD FOR OPERATING A HEARING DEVICE AND HEARING DEVICE

TECHNICAL FIELD

The present invention relates to a method for operating a hearing device and to a corresponding hearing device. More specifically, the present invention relates to sample-rate conversion in such hearing devices. The invention may e.g. be useful in applications such as e.g. a hearing aid or a listening device, which receives acoustic signals from a person's surroundings, modifies the acoustic signals electronically and transmits the modified acoustic signals into the person's ear or ear canal, or such as e.g. a headset, which receives audio signals electronically and transmits corresponding acoustic signals into the person's ear or ear canal.

BACKGROUND ART

Hearing devices that perform digital signal processing of digital audio signals received from another device are known in the art. Such hearing devices may be designed so that the processing rate, i.e. the rate with which the signal processing requires input samples, equals the input rate, i.e. the rate with which audio signal samples are received. However, various factors, such as production tolerances, variations in the clock frequencies of the transmitting and receiving devices and errors in the transmission, may cause the input rate to at least temporarily deviate from the processing rate. At the same time it is often desired to keep the processing rate constant over time. In such cases, the input signal is preferably pre-processed to ensure that the signal processing receives the required samples at the processing rate.

A known and rather simple solution is to provide the hearing device with an input buffer into which the received samples are written on arrival and from which the respective oldest unread sample is read by the signal processing when it requires a new sample. When a buffer under-run occurs, i.e. when the buffer is empty when a read operation is due, then the last sample read is repeated as input to the signal processing. When a buffer over-run occurs, i.e. when the buffer is full when a write operation is due, then the sample to be written is discarded (skipped). This simple form of sample-rate conversion, in the following referred to as skip-and-repeat, has the disadvantage that the skipping and repeating of samples causes clearly audible artefacts in the processed signal. It is further only successfully applicable when the input rate and the processing rate are close to each other.

It is further known to upsample the input signal to provide samples at a resampling rate which is an integer multiple—defined as the upsampling factor—of the input rate. The skip-and-repeat procedure is performed on the upsampled signal, and thus at the resampling rate, to provide a sample rate equalling an integer multiple of the processing rate. The resulting signal is subsequently downsampled to the processing rate by an integer downsampling factor. This upsampled skip-and-repeat method also causes artefacts in the processed signal, but they are less audible than those caused by the simple skip- and repeat method described above. Furthermore, by selecting different up- and downsampling factors this method may be used to perform sample-rate conversion when the input rate and the processing rate are not close to each other.

In the present context, the conversion ratio is defined as the ratio of the processing rate to the input rate. The range of conversion-ratio variations with which a device has to cope may differ between different systems and scenarios. If the range of variations is large and/or if variations occur fast, then a more sophisticated control of the skipping and repeating in the upsampled skip-and-repeat method is required to avoid that multiple skip operations or multiple repeat operations occur immediately after each other, which could otherwise significantly reduce the quality of the processed signal. The upsampled skip-and-repeat method is more sensitive to such variations than the simple method because in the upsampled method a single missing input sample may cause several consecutive repetitions of an upsampled signal sample. Where the input signal is received in packets each comprising multiple signal samples, the content of entire packets may be lost due to transmission errors. The loss of packets, and the well known and widely implemented retransmission of lost packets to avoid gaps in the processed audio signal, both worsen these problems.

In the above mentioned skip-and-repeat methods, multiple skip operations or multiple repeat operations occurring immediately after each other are mainly caused by the fact that the decision to increase or decrease the conversion ratio is taken on the basis of information regarding a single sample and that the decision is immediately carried out, namely by skipping or repeating the respective sample. Therefore, alternative methods have been developed in the art, which provide a slower working control of the conversion ratio.

One such known alternative method comprises performing sample-rate conversion with a piecewise constant conversion ratio, e.g. by upsampling and downsampling as described above, however without skipping and repeating upsampled samples. The received input samples are buffered, and the conversion ratio is increased when the buffer level, i.e. the number of buffered samples, sinks below a predetermined lower threshold, and conversely decreased when the buffer level grows above a predetermined upper threshold. The thresholds are preferably selected so that their difference is smaller than the total buffer size and they thus provide room both below the lower threshold and above the upper threshold. This extra room is used to allow for overshoot of the control algorithm. The buffer size, the buffer thresholds and the step sizes with which the conversion ratio is respectively increased and decreased are chosen such that they together allow the method to adapt to expected variations in the input rate without risking actual buffer under-runs or over-runs. The method also works when one of the upsampling and the downsampling factor equals unity.

Signal processing generally requires resources, such as logic circuits, memory space, computation time or power, each of which is typically a limited resource in hearing devices—and even more so in battery-powered hearing devices. It is therefore desirable to implement sample-rate conversion in hearing devices using methods that are particularly efficient. In most sample-rate conversion methods, and particular in such methods comprising upsampling and subsequent downsampling of the resampled signal, filtering is required to avoid aliasing artefacts in the processed signal. This filtering adds significantly to the complexity and the resource consumption of the sample-rate conversion, and the design of the filters is therefore of high importance in hearing devices. Upsampling followed by—or integral with—filtering to remove aliased frequencies is in the art generally referred to as interpolation. In the following, the term upsampling should be interpreted to cover both upsampling without such filtering and interpolation.

An efficient known method for sample-rate conversion comprises the use of so-called polyphase filters in the upsampling and in the downsampling steps. Each received input sample is fed in parallel to a set of digital filters, which each represents a specific phase of an interpolation filter to be applied. The outputs of the phase filters in the set are cyclically sampled at the resampling rate, one cycle for each input sample, and the thus resampled samples are cyclically fed to individual digital filters in a second set. Each filter in the second set represents a specific phase of a downsampling filter to be applied, and the outputs of these phase filters are added at the processing rate, thus providing a sample-rate-converted signal at the processing rate. The interpolation filter is typically configured to suppress frequencies above half the input rate, and the downsampling filter is typically configured to suppress frequencies above half the processing rate. The interpolation filter and the downsampling filter thus suppress aliasing artefacts in the processed signal. The sum of the lengths of the phase filters in a set is equal to or slightly larger than the length of the respective interpolation or downsampling filter.

In [1], chapter 10.5.3, "Time-Variant Filter Structures", the authors disclose how sample-rate conversion using polyphase filters may be implemented in a particularly efficient manner. In the disclosed method, the interpolation filter and the downsampling filter are combined in a single filter configured such that it suppresses frequencies above half the minimum of the input rate and the processing rate. The method allows the computation of the sample-rate converted signal to be performed basically by buffering the received input samples and at the processing rate computing a scalar product of a subset of the buffered samples and a subset of filter coefficients of the filter. The actual subsets to be used are selected dynamically from respectively the input buffer and a set of filter coefficients, using respective indices that are dynamically updated for each output sample to be computed.

The above described methods based on polyphase filters, may obviously be used in combination with the above described method wherein a piecewise constant conversion ratio is changed when the buffer level exceeds predetermined buffer thresholds. The conversion ratio may be changed by changing the upsampling factor and/or the downsampling factor. Since, however, the lengths and the coefficients of the phase filters depend on the up- and downsampling factors, the lengths and the coefficients of the phase filters must either be recomputed or be read from a repository of pre-stored filter configurations each time the conversion ratio changes. This obviously requires computation time and/or storage space in addition to the resources required for the conversion itself.

Furthermore, changing the conversion ratio based on predetermined buffer thresholds as described above causes the latency, i.e. the time delay from an input sample is received until the corresponding output sample is delivered to the signal processing, to vary with time and, at least to some extent, unpredictably. Also, in the known methods and devices, the buffer thresholds are chosen in advance and such that adaptation is possible when the input rate variations are within a range expected at the time of implementing the method or manufacturing the device. If the variations are larger than expected, the sample-rate conversion may not function properly, and if the variations are smaller than expected, the latency will be longer than needed. However, in hearing devices a consistent and short latency is often important, particularly when a hearing-device user is able to see the source of the sound he or she is listening to, e.g. when the user listens to the sound of a video or a TV broadcast.

Also, in hearing devices wherein retransmission of lost packets is implemented, the size of the input buffer and the value of the lower buffer threshold are typically selected to allow for a predetermined number of consecutive retransmissions of the same lost packet before a buffer under-run occurs. This, however, causes the latency to be larger than needed during time periods without retransmission.

DISCLOSURE OF INVENTION

It is an object of the present invention to provide a method for operating a hearing device, which method overcomes the above problems. It is a further object of the present invention to provide a hearing device, which does not suffer from the above problems.

These and other objects of the invention are achieved by the invention defined in the accompanying independent claims and as explained in the following description. Further objects of the invention are achieved by the embodiments defined in the dependent claims and in the detailed description of the invention.

Controlling the conversion ratio in sample-rate conversion of an input signal in dependence on an estimated quality of reception of the input signal allows for providing adaptive latency with a short latency when a user is close to the device transmitting the input signal and long latency is thus typically more annoying and with a long latency when the user is farther from the transmitting device and therefore the risk of retransmission is increased. Depending on the implementation, generated artefacts may be barely noticeable in speech and other every-day sounds, and adaptive latency may therefore advantageously be used in hearing devices.

Controlling the conversion ratio in a manner aiming at minimising the difference between estimated average or smoothed input-buffer levels and a target buffer level allows for adaptive latency with robust sample rate conversion and precise control of the latency.

Performing the sample-rate conversion by upsampling the input signal and subsequently downsampling the upsampled signal in combination with controlling the conversion ratio by operations on the upsampled signal further allows for efficient and robust sample rate conversion with precise control of the latency at the cost of only minor artefacts in the processed signal. Depending on the implementation, the artefacts may be barely noticeable in speech and other every-day sounds, and the method may therefore advantageously be used in hearing devices.

Performing the sample-rate conversion by computing each sample of the output signal as a scalar product of a subset of the buffered samples and a subset of filter coefficients, wherein said subsets are selected anew for each computed sample from respectively the input buffer and a set of filter coefficients, and wherein the selection of said subset of the buffered samples is made in dependence on the estimated average or smoothed input-buffer level allows for even more efficient sample rate conversion. The achievable low level of generated artefacts in such embodiments is rather surprising, since the Nyquist criterion is in fact violated every time the selection of said subset of the buffered samples is altered due to a change in the estimated average or smoothed input-buffer level, and therefore, aliasing artefacts were expected to be clearly audible in the processed signal.

In the present context, a "hearing device" refers to a device, such as e.g. a hearing aid, a listening device or an active ear-protection device, which is adapted to improve, augment and/or protect the hearing capability of a user by receiving acoustic signals from the user's surroundings, generating corresponding audio signals, optionally modifying the audio signals and providing the received or modified audio signals as audible signals to at least one of the user's ears. A "hearing device" further refers to a device such as an earphone or a headset adapted to receive audio signals electronically, optionally modifying the audio signals and providing the received or modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve and/or to the auditory cortex of the user.

A hearing device may be configured to be worn in any known way, e.g. as a unit arranged behind the ear with a tube leading air-borne acoustic signals into the ear canal or with a loudspeaker arranged close to or in the ear canal, as a unit entirely or partly arranged in the pinna and/or in the ear canal, as a unit attached to a fixture implanted into the skull bone, as an entirely or partly implanted unit, etc. A hearing device may comprise a single unit or several units communicating electronically with each other.

More generally, a hearing device comprises an input transducer for receiving an acoustic signal from a user's surroundings and providing a corresponding input audio signal and/or a receiver for electronically receiving an input audio signal, a signal processing circuit for processing the input audio signal(s) and an output means for providing an audible signal to the user in dependence on the processed audio signal(s). Some hearing devices may comprise multiple input transducers, e.g. for providing direction-dependent audio signal processing. In some hearing devices, the receiver may be a wireless receiver. In some hearing devices, the receiver may be e.g. an input amplifier for receiving a wired signal. In some hearing devices, an amplifier may constitute the signal processing circuit. In some hearing devices, the output means may comprise an output transducer, such as e.g. a loudspeaker for providing an air-borne acoustic signal or a vibrator for providing a structure-borne or liquid-borne acoustic signal. In some hearing devices, the output means may comprise one or more output electrodes for providing electric signals.

In some hearing devices, the vibrator may be adapted to provide a structure-borne acoustic signal transcutaneously or percutaneously to the skull bone. In some hearing devices, the vibrator may be implanted in the middle ear and/or in the inner ear. In some hearing devices, the vibrator may be adapted to provide a structure-borne acoustic signal to a middle-ear bone and/or to the cochlea. In some hearing devices, the vibrator may be adapted to provide a liquid-borne acoustic signal in the cochlear liquid, e.g. through the oval window. In some hearing devices, the output electrodes may be implanted in the cochlea or on the inside of the skull bone and may be adapted to provide the electric signals to the hair cells of the cochlea, to one or more hearing nerves and/or to the auditory cortex.

A "hearing system" refers to a system comprising one or two hearing devices, and a "binaural hearing system" refers to a system comprising one or two hearing devices and being adapted to cooperatively provide audible signals to both of the user's ears. Hearing systems or binaural hearing systems may further comprise "auxiliary devices", which communicate with the hearing devices and affect and/or benefit from the function of the hearing devices. Auxiliary devices may be e.g. remote controls, remote microphones, audio gateway devices, mobile phones, public-address systems, car audio systems or music players. Hearing devices, hearing systems or binaural hearing systems may e.g. be used for compensating for a hearing-impaired person's loss of hearing capability, augmenting or protecting a normal-hearing person's hearing capability and/or conveying electronic audio signals to a person.

As used herein, the singular forms "a", "an", and "the" are intended to include the plural forms as well (i.e. to have the meaning "at least one"), unless expressly stated otherwise. It will be further understood that the terms "has", "includes", "comprises", "having", "including" and/or "comprising", when used in this specification, specify the presence of stated features, integers, steps, operations, elements and/or components, but do not preclude the presence or addition of one or more other features, integers, steps, operations, elements, components and/or groups thereof. It will be understood that when an element is referred to as being "connected" or "coupled" to another element, it can be directly connected or coupled to the other element, or intervening elements may be present, unless expressly stated otherwise. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF THE DRAWINGS

The invention will be explained in more detail below in connection with preferred embodiments and with reference to the drawings in which.

The figures are schematic and simplified for clarity, and they just show details, which are essential to the understanding of the invention, while other details are left out. Throughout, like reference numerals and/or names are used for identical or corresponding parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description. Within this description, any such modifications are mentioned in a non-limiting way.

MODE(S) FOR CARRYING OUT THE INVENTION

Figure 1:
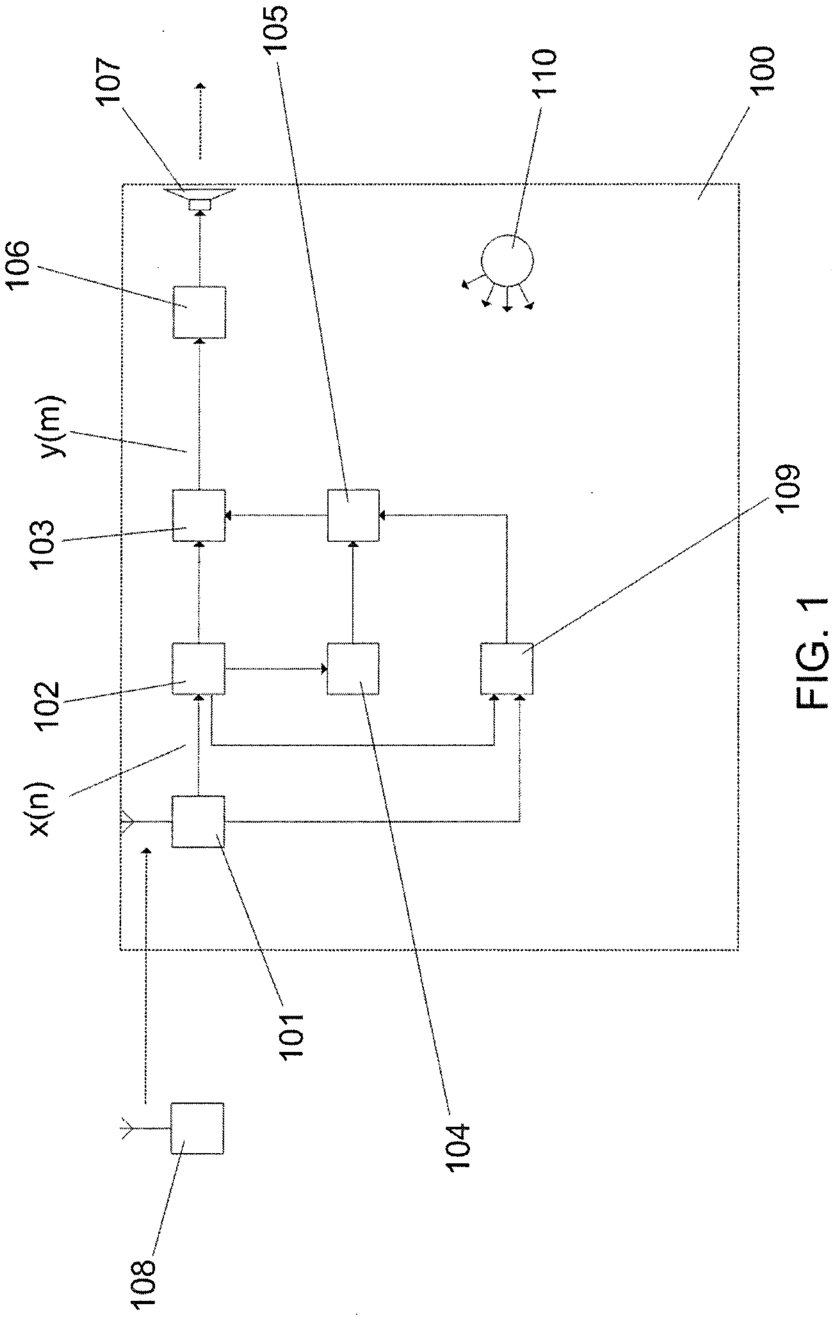
FIG. 1 shows an embodiment of a hearing device according to the invention.

The first embodiment of a hearing device 100 shown in FIG. 1 comprises a receiver 101, an input buffer 102, a sample processor 103, an estimator 104, a ratio controller 105, an amplifier 106 and an output transducer 107. The hearing device 100 may e.g. be an earphone or a headset and may be intended to be worn in an operating position by a user, such as e.g. at, in, on or close to an ear of the user.

A transmitter 108 transmits samples of a digital audio signal to the hearing device 100, e.g. by means of radio signals or other wired or wireless electronic signals. The transmitter may be any kind of device that is capable of transmitting a digital audio signal, such as e.g. a laptop computer, a mobile phone, a wireless microphone, a further hearing device etc. The transmission may be made using any suitable protocol, including continuous data protocols or packet data protocols such as e.g. Bluetooth Advanced Audio Distribution Profile (A2DP), which is a part of the Bluetooth 1.0 standard, or Bluetooth Low Energy (BLE), which is a part of the Bluetooth 4.0 standard. The transmitter 108 is external to the hearing device 100, but in some embodiments the transmitter 108 may instead be comprised by the hearing device 100.

The receiver 101 receives the samples of the digital audio signal and feeds the received samples as a digital input signal x(n) to the input buffer 102. The receiver 101, optionally assisted by the transmitter 108, may apply any known method and technology, such as e.g. message checksums, forward error correction coding and decoding, retransmission of lost data packets etc., to ensure that errors in the received samples are corrected and/or to avoid that transmission errors cause gaps or other discontinuities in the audio signal provided in the digital input signal x(n).

The sample processor 103 processes the buffered samples to provide samples of a digital output signal y(m) such that the digital output signal y(m) is a sample-rate converted representation of the digital input signal x(n) with a predetermined target sample rate $F_y$, which is preferably equal to the processing rate of the amplifier 106. The sample processor 103 may use any of the sample-rate conversion methods known in the prior art, in particular any of the methods described further above, provided that the implemented method allows for a variation of the conversion ratio. The sample processor 103 preferably uses one or more of the methods explained below in relation to FIGS. 3, 4 and 5.

The estimator 104 repeatedly determines an average or smoothed input-buffer level l(t) indicating an actual buffer level, i.e. the number N (see FIG. 6) of unprocessed samples in the input buffer 102. The average or smoothed input-buffer level l(t) may be determined using any known averaging or smoothing method, such as e.g. repeatedly counting the number N of unprocessed samples in the input buffer 102 and computing an average over a sliding time window of the count results or low-pass filtering the count results. The counting may be achieved by any known counting method, such as e.g. computing the difference between an input pointer to the next write position and an output pointer to the next read position in the input buffer 102 or by incrementing a counter value when a write operation occurs and decrementing the counter value when a read operation occurs. In the case that samples in the input buffer 102 are skipped in the sample-rate conversion, such samples are regarded as processed and do thus not contribute to the actual buffer level N. The estimator 104 preferably uses one or more of the methods explained below in relation to FIG. 6.

The ratio controller 105 is adapted to control the sample processor 103 in a manner aiming at minimising the difference between the estimated average input-buffer level l(t) and a target buffer level L. The ratio controller 105 may achieve this by means of any known method of minimising said difference, such as e.g. adaptive least-mean-squares (LMS) methods or proportional control methods. The ratio controller 105 preferably comprises or constitutes a proportional-derivative (PD) controller or a proportional-integral-derivative (PID) controller and thus preferably achieves its goal by means of respectively proportional-derivative control or proportional-integral-derivative control. The ratio controller 105 may preferably control the sample processor 103 by providing one or more control parameters to the sample processor 103. The control parameters may comprise any parameter that the sample processor 103 may use to determine that, and/or when, a skip or a repeat operation should be performed and/or to determine that the conversion ratio should be changed by other means, such as by changing an upsampling or a downsampling factor. Suitable control parameters may indicate e.g. a target conversion ratio, an amount of change to be effected of the current conversion ratio or a time shift to be effected. The sample processor 103 may adjust the conversion ratio to match as good as possible and within predetermined constraints the indicated target conversion ratio or a conversion ratio resulting from adding the indicated amount of change to the current conversion ratio, or to effect as good as possible and within predetermined constraints the indicated time shift in the processing of buffered input samples x(n).

The amplifier 106 receives the samples of the digital output signal y(m) from the sample processor 103 and provides a corresponding amplified signal to the output transducer 107. The amplifier 106 may be or comprise any known type of amplifier suitable for providing an amplified signal corresponding to the digital output signal y(m), such as e.g. a digital pulse-width-modulator, a digital-to-analog converter followed by an analog amplifier or by an analog pulse-width-modulator, etc. The amplifier 106 may further comprise a signal processor (not shown) adapted to modify the digital output signal y(m) in any known way, e.g. to suppress noise, reverberation, echoes, transients, acoustic feedback etc., to enhance speech perception, spatial cues or the like, to compensate for the user's loss of hearing capability, or to augment or protect the user's hearing capability.

The output transducer 107 converts the amplified signal into an acoustic signal. When the hearing device 1 is worn in the operation position by the user, the acoustic signal may enter the ear or the ear canal of the user, which may thus hear the acoustic signal and thus ideally perceive the original audio signal comprised in digital form by the samples received from the transmitter 108 or an enhanced or improved version thereof. In some embodiments, the output transducer 107 and optionally the amplifier 106 may be replaced by other suitable output means, such as the ones mentioned in the general description of hearing devices in the section "Disclosure of the invention".

In some embodiments, the hearing device 100 may further comprise a latency controller 109 that controls the target buffer level L in dependence on an estimated quality of reception of the digital audio signal. The latency controller 109 may preferably increase the target buffer level L in dependence on the estimated quality of reception decreasing and vice versa. The quality of reception may preferably be estimated on the basis of repeated determinations of the actual buffer level N. The latency controller 109 preferably uses one or more of the methods explained below in relation to FIG. 7.

The hearing device 100 may further comprise a battery or an accumulator 110 that supplies electric power to the electronic circuits of the hearing device 100. Alternatively, or additionally, the hearing device 100 may receive electric power from an external device, such as the transmitter 108, e.g. via the transmission signal or by other wired or wireless power transmission means.

The second embodiment of a hearing device 200 shown in FIG. 2 comprises a receiver 101, an input buffer 102, a sample processor 103, an estimator 104, a ratio controller 105, an amplifier 106, an output transducer 107, an optional latency controller 109 and an optional battery or accumulator 110 having construction, connections and function as the corresponding elements of the first embodiment of FIG. 1, except for deviations explained below. The hearing device 200 may e.g. be a hearing aid, a listening device or an active ear-protection device and may be intended to be worn in an operating position at, in, on or near an ear of a user. The hearing device 200 may receive samples of a digital audio signal from a transmitter 108 as described above in relation to FIG. 1. The hearing device 200 further comprises microphone 201, a preamplifier 202, a digitiser 203, a signal processor 204 connected with the amplifier 106 and the output transducer 107 to form an audio signal path.

The microphone 201 is arranged such that it may receive an acoustic input signal from the user's surroundings when the hearing device 200 is worn in the operating position by the user and thus provide a corresponding microphone signal to the preamplifier 202. The preamplifier 202 amplifies the microphone signal and provides the amplified microphone signal to the digitiser 203. The digitiser 203 digitises the amplified microphone signal and provides a digitised main audio signal to the signal processor 204, which may modify the main audio signal in accordance with the purpose of the hearing device 200, e.g. to improve, augment and/or protect the hearing capability of the individual. The signal processor 204 provides the modified audio signal to the amplifier 106 instead of the digital output signal y(m).

The signal processor 204 is further connected to receive the digital output signal y(m) from the sample processor 103 and provides the modified audio signal to the amplifier 106 in dependence on a combination of the digital output signal y(m) and the digitised main audio signal. If, for instance, the transmitter 108 is a mobile phone, the signal processor 204 may switch between providing a modified or unmodified version of the digital output signal y(m) and a modified version of the digitised main audio signal in the modified audio signal to the amplifier 106, depending on whether the mobile phone is respectively engaged in a call or not. The signal processor 204 may, alternatively or additionally, combine the audio signals in the two input signals in any other known way, such as e.g. by adding them.

Figure 2:
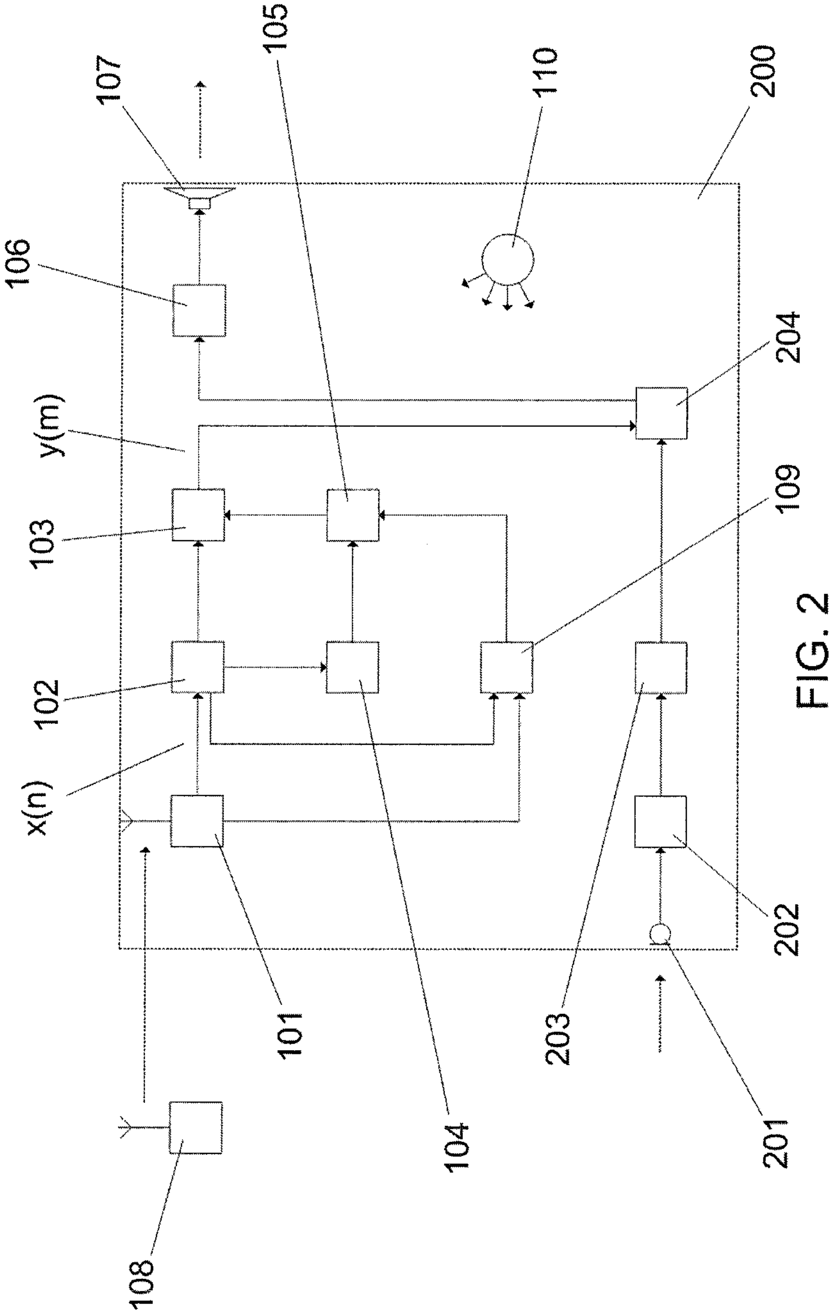
FIG. 2 shows a further embodiment of a hearing device according to the invention.
Figure 3:
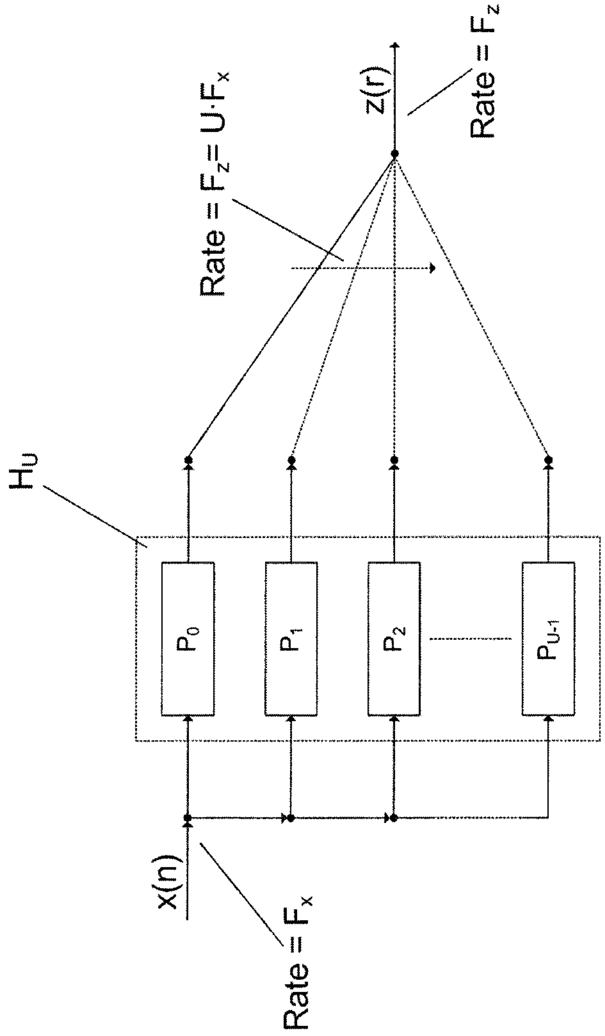
FIG. 3 illustrates upsampling in embodiments of the invention.

FIG. 3 illustrates upsampling of a digital input signal x(n) using a polyphase filter as it may be comprised by embodiments of the invention, such as the ones shown in FIGS. 1 and 2. The sample processor 103 and/or the input buffer 102 may thus comprise the elements shown in FIG. 3. The use of polyphase filters for upsampling is well known in the art, and so are its advantages with respect to efficiency and ease of implementation (see e.g. [1], chapter 10.52). When a sample of the digital audio signal arrives from the transmitter 108, the receiver 101 may perform error correction, request retransmission of lost samples or packets of samples and/or discard duplicate samples or packets of samples in order to provide a digital input signal x(n) with as few errors and discontinuities as possible.

The digital input signal x(n) has a sample rate $F_x$ that may vary over time. The sample rate $F_x$ may be directly reflected in the arrival times for the individual samples of the digital audio signal at the receiver 101 if the samples are transmitted continuously. If, however, the transmission from the transmitter 108 to the hearing device 100, 200 is packet-based, the exact instantaneous sample rate $F_x$ is undefined. In the latter case, or in the case that the samples arrive irregularly due to transmission errors or other causes, references in the following to the sample rate $F_x$ should be interpreted to include average values over an appropriate number of samples, e.g. over one or more packets.

The individual samples of the digital input signal x(n) are written in parallel to the inputs of a number U of upsampling phase filters $P_u$, u=0 . . . U−1, which each represents a specific phase of an interpolation filter $H_U$. The number U of upsampling phase filters $P_u$ equals the upsampling factor. The interpolation filter $H_U$ is a conventional finite-impulse-response (FIR) filter of length J, and its coefficients $h_U(j)$ are computed such that the interpolation filter $H_U$ would suppress frequencies above half the sample rate $F_x$ and pass frequencies below unaltered if applied to a digital signal. If the filter length J is initially not an integer multiple of U, then the interpolation filter $H_U$ is padded with zero coefficients to achieve this. The coefficients $p_u(i)$ of the upsampling phase filters $P_u$, which are FIR filters of length J/U, are computed from $p_u(i)=h_U(u+i\cdot U)$ for u=0 . . . U−1 and i=0 . . . J/U−1. The outputs of the upsampling phase filters $P_u$ are cyclically resampled at the resampling rate $F_z=U\cdot F_x$ in order of increasing u to provide an upsampled signal z(r).

Figure 4:
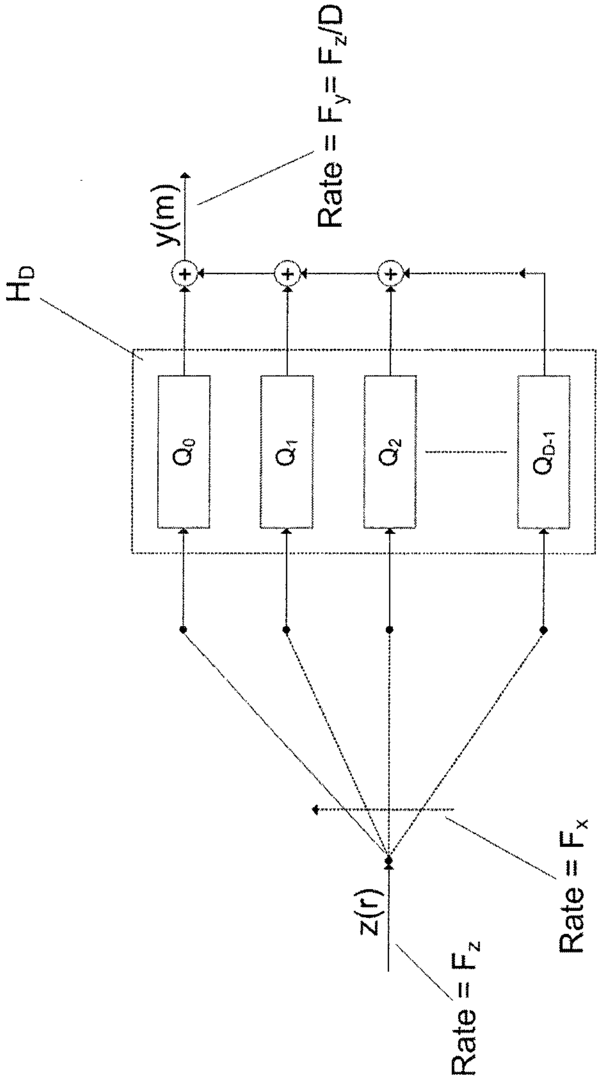
FIG. 4 illustrates downsampling in embodiments of the invention.

FIG. 4 illustrates downsampling of a digital signal, such as the upsampled signal z(r) provided in FIG. 3, using a polyphase filter as it may be comprised by embodiments of the invention, such as the ones shown in FIGS. 1 and 2. The sample processor 103 may thus comprise the elements shown in FIG. 4. The use of polyphase filters for downsampling is well known in the art, and so are its advantages with respect to efficiency and ease of implementation (see e.g. [1], chapter 10.5.2).

As illustrated, the upsampling and/or said downsampling may comprise the use of a polyphase filter ($P_u$, $Q_d$). The sample processor (103) comprises a polyphase filter ($P_u$, $Q_d$) for said upsampling and/or downsampling.

The individual samples of the upsampled signal z(r) are written cyclically to the inputs of a number D of downsampling phase filters $Q_d$, d=0 . . . D−1, in order of decreasing d. The number D of downsampling phase filters $Q_d$ equals the downsampling factor, and each downsampling phase filter $Q_d$ represents a specific phase of a downsampling filter $H_D$. The downsampling filter $H_D$ is a conventional FIR filter of length K. If the filter length K is initially not an integer multiple of D, then the downsampling filter $H_D$ is padded with zero coefficients to achieve this. The coefficients $q_d(i)$ of the downsampling phase filters $Q_d$, which are FIR filters of length K/D, are computed from $q_d(i)=h_D(d+i\cdot D)$ for d=0 . . . D−1 and i=0 . . . K/D−1. The outputs of all the downsampling phase filters $Q_d$ are summed and resampled at the target sample rate $F_y=F_z/D=F_x\cdot U/D$ to provide a sample-rate converted signal that preferably constitutes the digital output signal y(m) of the sample processor 103. The coefficients $h_D(k)$ of the downsampling filter $H_D$ are computed such that the downsampling filter $H_U$ would suppress frequencies above half the sample rate $F_y$ of the digital output signal y(m) and pass frequencies below unaltered if applied to a digital signal.

In embodiments of the invention, such as the ones shown in FIGS. 1 and 2, sample-rate conversion may be achieved by combining the elements shown in FIGS. 3 and 4. In such embodiments, the sample processor 103 may control the conversion ratio U/D by performing skip and/or repeat operations on the upsampled samples z(r) and/or by changing the upsampling and/or downsampling factor U, D. Preferably, the sample processor 103 may work in one mode, wherein it performs skip and/or repeat operations, as long as this suffices to minimise the difference between the estimated average or smoothed input-buffer level l(t) and the target buffer level L, and may work in another mode, wherein it only changes the upsampling and/or the downsampling factor U, D, when said difference is too large or changing too fast to allow minimising by skip and/or repeat operations without either risking multiple skip or multiple repeat operations on consecutive samples z(r) or risking a too large deviation from the target buffer level L, e.g. a buffer over-run or a buffer under-run. The ratio controller 105 may control the working mode of the sample processor 103 in dependence on said difference and/or on the speed of variation of said difference, e.g. by comparing one or both of these to predetermined thresholds. The upsampling and downsampling described above and possible implementations are discussed in detail in [1], chapter 10.5.2.

Figure 5:
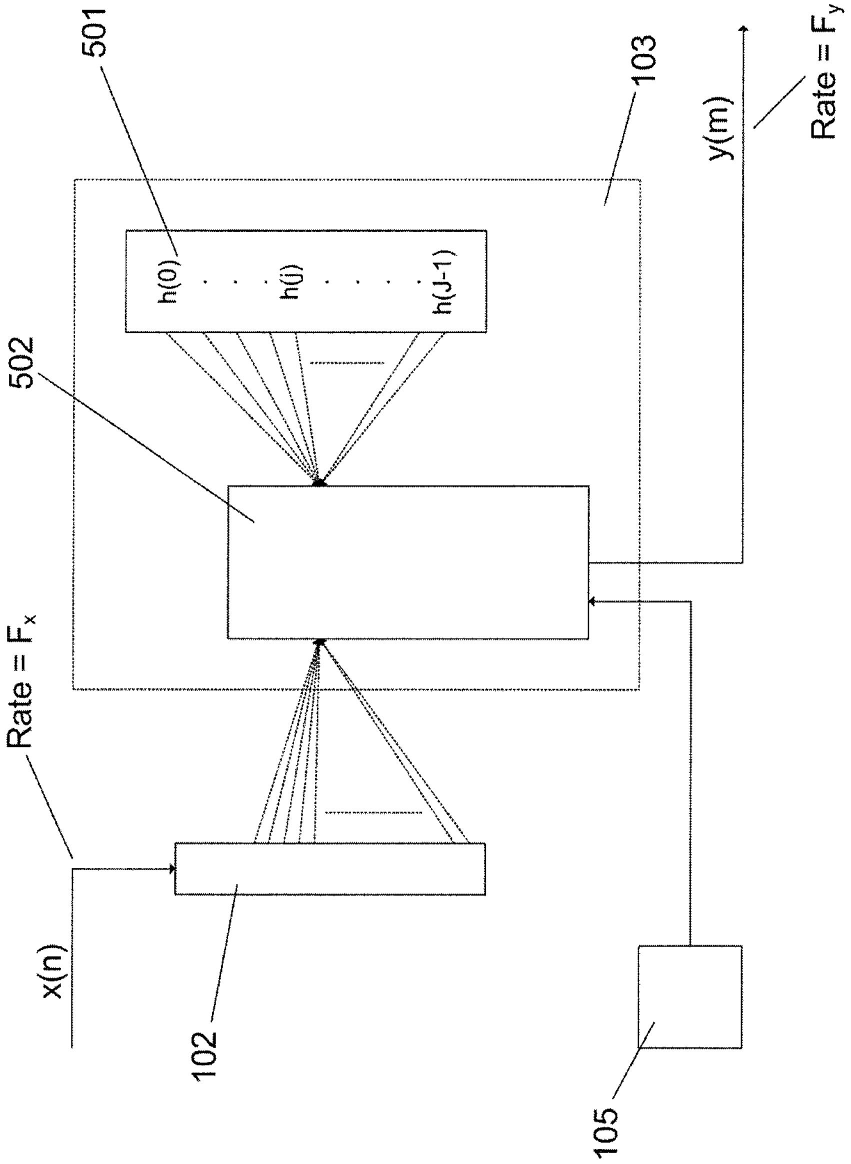
FIG. 5 illustrates sample-rate conversion in embodiments of the invention.

Alternatively, and preferably, sample-rate conversion based on a time-variant filter structure as disclosed in [1], chapter 10.5.3 may be used and may thus be comprised by embodiments of the invention, preferably by the sample processor 103 and/or the input buffer 102 described above. Such sample-rate conversion is illustrated in FIG. 5 and may preferably be based on the following equation:

$$y(m) = \sum_{i=0}^{\frac{J}{U}-1} g\left(i - \left\lfloor \frac{m}{U} \right\rfloor U\right) \cdot x\left(\left\lfloor \frac{mD}{U} \right\rfloor - i\right) \quad \text{EQ1}$$

wherein U and D are up- and downsampling factors as described above, and the operator ⌊R⌋ provides the integer portion of the number R such that the remainder is always positive. EQ1 corresponds to equation (10.5.8) from [1], however with slightly deviating letter symbols. The meanings of the remaining letter symbols are explained below. EQ1 is preferably combined with equation EQ2, which corresponds to equation (10.5.7) from [1]:

$$g(a,b)=h(aU-(bD)_U) \quad \text{EQ2:}$$

wherein the function g(a,b) defines a time-variant filter and $(bD)_U$ provides bD modulo U, i.e. the positive remainder of bD after division with U. EQ1 may thus be rewritten as:

$$y(m) = \sum_{i=0}^{\frac{J}{U}-1} h(iU - (mD)_U) \cdot x\left(\left\lfloor \frac{mD}{U} \right\rfloor - i\right) \quad \text{EQ3}$$

Thus, up- and downsampling as well as the accompanying filtering to prevent aliasing may be accomplished by buffering samples of the digital input signal x(n) and for each sample to provide of the digital output signal y(m), preferably at the target sampling rate $F_y$, computing the sample y(m) as a scalar product of a dynamically selected subset of the buffered samples x(n) and a dynamically selected subset of filter coefficients h(j) of an FIR filter H of length J. The filter coefficients h(j) of the filter H are preferably computed such that the filter H would suppress frequencies above the lower one of the cut-off frequencies of respectively the interpolation filter $H_U$ and the downsampling filter $H_D$ described further above. The filter H would thus suppress frequencies above half the minimum of the input sample rate $F_x$ and the target sampling rate $F_y$ and pass frequencies below unaltered if applied to a digital signal. If J is initially not an integer multiple of the upsampling factor U, then the filter H is padded with zero coefficients to achieve this. The filter coefficients h(j) are preferably stored in a coefficient table 501, which may be comprised by the sample processor 103.

The high efficiency of this sample-rate conversion is partly due to the fact that only J/U multiplications need be performed for each output sample y(m), namely the J/U products between respective elements of the two subsets. Since each of the indices i and m is preferably traversed in steps of unity, the product iU may be computed by successively adding U, and the term $(mD)_U$ may be computed by successively adding D and subtracting U whenever the sum exceeds U. Similarly, the integer portion of the fraction mD/U may be computed by successively adding D, subtracting U when the sum exceeds U, and increasing a counter for each made subtraction; the value of the counter yields said integer portion. Thus, the actual subsets to be used in the scalar product may be selected dynamically from respectively an input buffer 102 and the predetermined set of filter coefficients h(j) in the coefficient table 501, using respective indices that are dynamically updated using only addition, subtraction and comparison operations. The computations may be made in an arithmetic unit 502, which may be comprised by the sample processor 103. Further details and possible implementations are discussed in detail in the reference [1]cited below at chapter 10.5.3. In particular, preferred embodiments include those disclosed in [1], chapter 10.5.3, such as e.g. the block processing algorithm illustrated in drawing "FIG. 10.16" [1], the filter structure illustrated in drawing "FIG. 10.17" [1], and the embodiment with U polyphase filters disclosed in the last part of the chapter.

Prior to the buffering of received samples, error correction etc. as described above for FIG. 3, may be performed, e.g. by the receiver 101, and the observations as to the meaning of the sample rate $F_x$ of the digital input signal x(n) are also the same as for FIG. 3.

The sample processor 103 may control the conversion ratio by changing the upsampling and/or downsampling factor U, D. Since, however, the upsampled signal z(r) is not directly available in EQ1 or EQ3, nor in the implementations disclosed in [1], performing skip or repeat operations on the upsampled signal z(r) is not possible without further. However, EQ1 and EQ3 as well as the implementations disclosed in [1] may be modified to allow an operation similar to skipping and repeating samples of the upsampled signal z(r). This is achieved by modifying the computation of the index of the digital input signal x(n) in EQ1 and EQ3 such that it changes in dependence on the difference between the estimated average or smoothed input-buffer level (l(t)) and the target buffer level (L) as shown in:

$$y(m) = \sum_{i=0}^{\frac{J}{U}-1} h(iU - (mD)_U) \cdot x\left(\left\lfloor \frac{mD}{U} \right\rfloor + S(m) - i\right) \quad \text{EQ4}$$

which corresponds to EQ3, except that an integer primary sample index modifier S(m) is added to the index to x(n). The primary sample index modifier S(m) is preferably updated for each output sample y(m) to compute. Increasing or decreasing the primary sample index modifier S(m) before computation of an output sample y(m) causes the time-variant filter to operate on a subset of the buffered samples x(n) that is shifted one sample respectively forwards or backwards in time. The effect hereof is equal to the effect of respectively a skip or a repeat operation on the digital input signal x(n) as described further above in the respect that it temporarily modifies the conversion ratio. Since, however, the entire subset is shifted in time in EQ4, the digital output signal y(m) has less pronounced artefacts than a corresponding digital output signal y(m) obtained by sample-rate conversion using simple skip or repeat operations on the digital input signal x(n); the level of artefacts produced is in fact comparable to the level produced when using simple skip or repeat operations on an upsampled signal z(r).

The ratio controller 105 may thus control the conversion ratio in the sample processor 103 by causing a change of the primary sample index modifier S(m). The ratio controller 105 may provide the primary sample index modifier S(m) as a control parameter to the sample processor 103. Alternatively, the ratio controller 105 may provide a secondary sample index modifier s(m) as a control parameter to the sample processor 103, and the sample processor 103 may explicitly or implicitly compute the primary sample index modifier S(m) in dependence on the secondary sample index modifier s(m), e.g. according to:

$$y(m)=\sum_{i=0}^{\frac{J}{U}-1} h(iU-(mD)_U)\cdot x\left(\left\lfloor\frac{mD+\sum s(m)}{U}\right\rfloor-i\right) \quad \text{EQ5}$$

where Σs(m) provides the accumulated sum of the secondary sample index modifier s(m) over time. Note that EQ5 may be transformed into EQ4 by expressing the primary sample index modifier S(m) as a function of the secondary sample index modifier s(m), m, D and U. The secondary sample index modifier s(m) may be an integer function, but is preferably a fractional function in order to allow for a more even distribution in time of shifts in the subset of the buffered samples x(n). The value of the secondary sample index modifier s(m) for a specific index m thus indicates a desired time shift in the sample-rate conversion in the form of a fraction s(m)/U of an input sample interval $1/F_x$, whereas the primary sample index modifier S(m) more or less corresponds to an integral over time of the secondary sample index modifier s(m) and thus indicates a sum of all preceding desired time shifts. Both for the primary sample index modifier S(m) and for the secondary sample index modifier s(m), the index to x(n) may be computed merely by adding, subtracting and comparing values as described further above.

The ratio controller 105 may compute or update the primary or the secondary sample index modifier S(m), s(m) once for each output sample y(m) or at larger intervals depending on the required speed of controlling the conversion ratio. In some embodiments, the ratio controller 105 may compute or update the primary or the secondary sample index modifier S(m), s(m) during computation of an output sample y(m), such that the primary or the secondary sample index modifier S(m), s(m) becomes in effect a function of both indices m and i. In this case, less than the entire subset is shifted in time for the particular output sample y(m), and the artefacts produced are typically more pronounced. Nevertheless, such embodiments may be preferable in some situations.

The person skilled in the art should be readily able to apply the above described modifications according to EQ4 or EQ5 to the implementations disclosed in [1], chapter 10.5.3, such as e.g. the block processing algorithm illustrated in drawing "FIG. 10.16" in [1], the filter structure illustrated in drawing "FIG. 10.17" in [1], and the embodiment with U polyphase filters disclosed in the last portion of the chapter. In the filter structure illustrated in drawing "FIG. 10.17" in [1], the modifications may comprise increasing the length of the shift register and providing a multiplexer before each hold-and-sample device that allows the hold-and-sample device to select its input from any one of a number of consecutive memory cells in the shift register. In the case that the sample-rate conversion is implemented in software, the required modifications are rather straight forward.

In some embodiments, the sample processor 103 may work in one mode, wherein it performs the above described time shift operations, as long as this suffices to minimise the difference between the estimated average or smoothed input-buffer level l(t) and the target buffer level L, and may work in another mode, wherein it only changes the upsampling and/or the downsampling factor U, D, when said difference is too large or changing too fast to allow minimising by the above described time shift operations without risking a too large deviation from the target buffer level L, e.g. a buffer over-run or a buffer under-run. The ratio controller 105 may control the working mode of the sample processor 103 in dependence on said difference and/or on the speed of variation of said difference, e.g. by comparing one or both of these to predetermined thresholds.

In any of the above described embodiments of sample-rate conversion, the ratio controller 105 may provide one or more control parameters, such as e.g. the primary or the secondary sample index modifier S(m), s(m) or any other suitable control parameter, e.g. a target conversion ratio or a desired shift in the current conversion ratio. The ratio controller 105 preferably computes or updates the one or more control parameters repeatedly, e.g. once for every output sample y(m) or any other intervals, such as e.g. larger or smaller intervals, depending on the required speed of controlling the conversion ratio. The ratio controller 105 may preferably compute or update the one or more control parameters by means of the well known proportional-derivative control algorithm or the well known proportional-integral-derivative control algorithm.

To this end, the ratio controller 105 may preferably compute the difference e(k) between the average or smoothed input-buffer level l(t) received from the estimator 104 and the target buffer level L, which may e.g. be a fixed value stored in the ratio controller 105 or a varying value received from the latency controller 109, and use this difference e(k) as an error input to an error-minimising control algorithm that computes consecutive values of a control parameter w(k). In a proportional-integral-derivative control, the control parameter w(k) is iteratively computed according to:

$$w(k)=w(k-1)+K_p\cdot e(k)+K_d\cdot\frac{de}{dk}+K_i\cdot\int edk \quad \text{EQ6}$$

wherein $K_p$, $K_d$ and $K_i$ are predetermined constants, which may be determined in advance by experimentation or analytically from knowledge about the expected behaviour of the digital input signal x(n). In a proportional-derivative control $K_i$ is set to zero. In embodiments providing the secondary sample index modifier s(m) as a control parametere, EQ6 may be rewritten as:

$$s(m) = s(m-1) + K_p \cdot e(k) + K_d \cdot \frac{de}{dm} + K_i \cdot \int edk \quad \text{EQ7}$$

In addition or alternatively, the ratio controller 105 may use other known types of control algorithms, such as e.g. lead, lag or lead-lag compensators.

Figure 6:
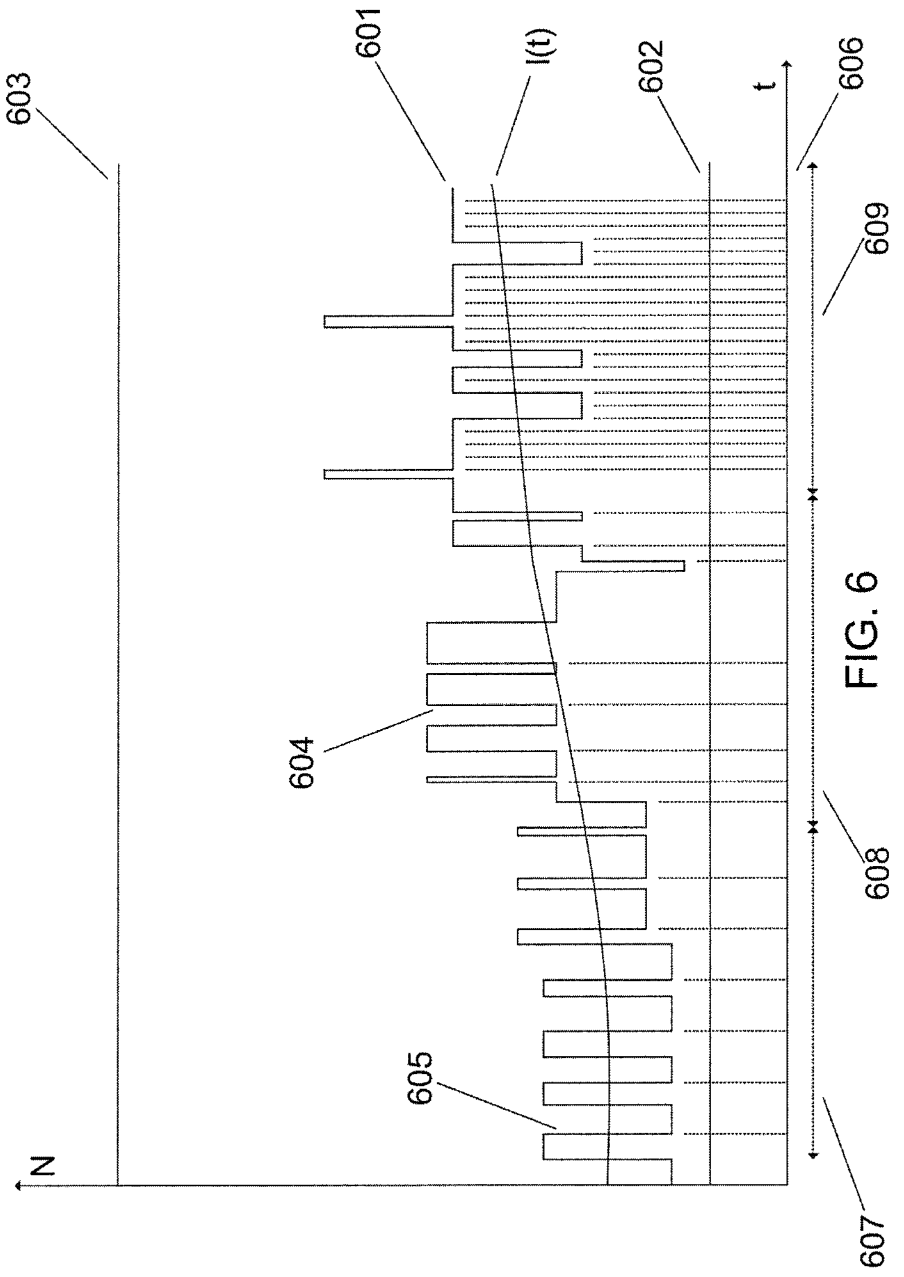
FIG. 6 illustrates determination of input-buffer levels in embodiments of the invention.

In any of the above described embodiments of sample-rate conversion, the estimator 104 may preferably provide the average or smoothed input-buffer level l(t) as illustrated in FIG. 6. The curve 601 illustrates an example of the variation over time t of the actual buffer level N. The input buffer 102 may have a lower threshold 602 and an upper threshold 603 which may equal respectively zero and the buffer size, or alternatively lie away from these extremes in order to allow overshoot of the control algorithm applied by the ratio controller 105. In the shown example, the receiver 101 feeds packets of samples x(n) into the input buffer 102, which causes the curve 601 to increase by the packet size, e.g. during the write operation 604. The packets arrive irregularly due to transmission errors. The sample processor 103 reads a number N of buffered samples x(n) at regular intervals, which causes the curve 601 to decrease by the number of samples read, e.g. during the read operation 605.

The time line 606 is divided into three time periods, wherein vertical dotted lines illustrate different methods for determining an actual input-buffer level N. In the first period 607, the actual buffer level N is sampled every time a read operation 605 by the sample processor 103 occurs. In the second period 608, the actual buffer level N is sampled every time a write operation 604 by the receiver 101 occurs. In the third period 609, the actual buffer level N is sampled at regular time intervals which are preferably substantially shorter than the intervals between successive write operations 604 and substantially shorter than the intervals between successive read operations 605. The estimator may use any of the illustrated sample methods, or any combination thereof, to provide input data to a smoothing or averaging algorithm for providing the average or smoothed input-buffer level l(t).

The estimator 104 may preferably compute an average over a sliding time window of the sample results or, alternatively or additionally, low-pass filter the sample results to obtain the average or smoothed input-buffer level l(t). Due to the different sampling times relative to upwards and downwards shifts in the actual buffer level N, the illustrated sample methods typically cause the smoothing or averaging algorithm to provide different results, and the estimator 104 may therefore preferably subtract from the output of the average or low-pass filter a constant value that reflects a typical estimation error for the implemented sampling method before providing the average or smoothed input-buffer level l(t) to the ratio controller 105. The width of the time window, the characteristics of the low-pass filter and/or typical estimation errors may be determined in advance by experimentation or analytically from knowledge of the packet sizes, of the number of samples read in batch by the sample processor 105, of expected variations in the arrival times of the digital input signal x(n), and of the characteristics of the hardware and/or software involved in the sample-rate conversion.

Figure 7:
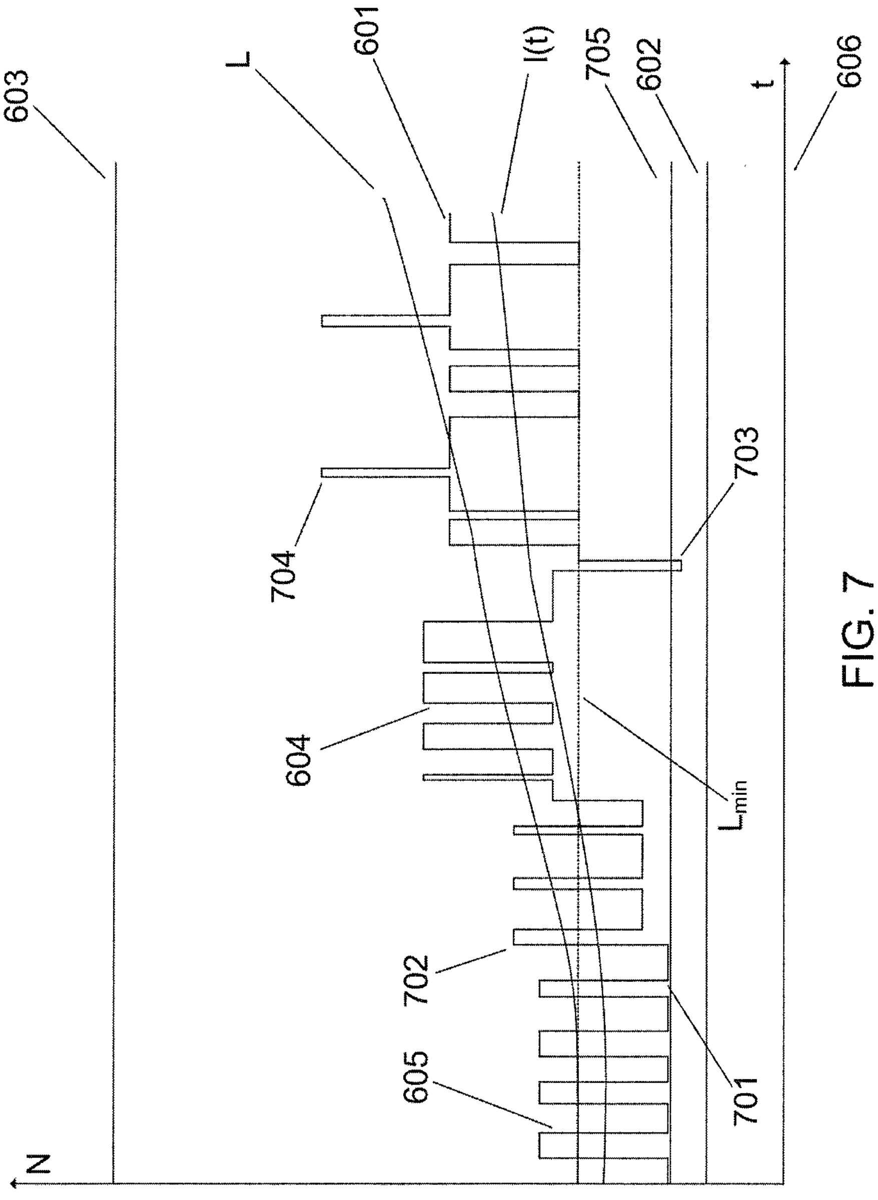
FIG. 7 illustrates adaptive latency control in embodiments of the invention.

In any of the above described embodiments of sample-rate conversion, the latency controller 109 may preferably provide the target buffer level L adaptively as illustrated in FIG. 7. As in FIG. 6, the curve 601 illustrates an example of the variation over time t of the actual buffer level N, and the input buffer 102 may have a lower threshold 602 and an upper threshold 603 as described above. Again, the sample processor 103 reads a number of buffered samples x(n) at regular intervals, e.g. during the read operation 605, and the receiver 101 feeds packets of samples x(n) into the input buffer 102, e.g. during the write operation 604. In the shown example, the packets arrive irregularly due to a decrease over time of the quality of reception of the digital audio signal. Thus, in the leftmost part of the figure, the difference between the local minimum 701 and the local maximum 702 of the actual buffer level N is relatively small, whereas in the rightmost part, the difference between the local minimum 703 and the local maximum 704 of the actual buffer level N is relatively large. The average or smoothed input-buffer level l(t) provided by the estimator 104 is also shown.

The latency controller 109 may preferably control the target buffer level L in dependence on the estimated quality of reception of the digital audio signal in order to achieve a short latency when the quality of reception is high and a long latency when the quality of reception is low. The latency is correlated with the target buffer level L because the ratio controller 105 works to minimise the difference e(k) between the estimated average or smoothed input-buffer level l(t) and the target buffer level L, and the latency controller 109 may thus preferably decrease the target buffer level L when the estimated quality of reception is high and increase the target buffer level L when the estimated quality of reception is low.

In some embodiments, the latency controller 109 may achieve control of the target buffer level L in dependence on the estimated quality of reception of the digital audio signal in an indirect manner, e.g. by determining local minima 701, 703 in the actual buffer level N and controlling the target buffer level L in dependence on the determined local minima 701, 703. The latency controller 109 may e.g. increase the target buffer level L whenever a determined local minimum 701, 703 is below a predetermined threshold 705 and iteratively decrease the target buffer level L as long as the determined local minima 701, 703 are above the predetermined threshold 705. The predetermined threshold 705 may equal the lower threshold 602 or may be higher in order to allow overshoot of the latency control algorithm without risking buffer under-run. The latency controller 109 may e.g. immediately increase the target buffer level L by an amount equal to the amount which a determined local minimum 701, 703 is below the predetermined threshold 705 and subsequently decrease the target buffer level L, e.g. exponentially, towards a minimum target buffer level $L_{min}$, e.g. with a time constant between 1 and 3 s, between 2 and 6 s or between 3 and 10 s. Alternatively, the latency controller 109 may track the local minima 701, 703 and employ the above described increases and decreases of the target buffer level L in dependence on a low-pass filtered or otherwise smoothed minimum track value.

Preferably, the latency controller 109 may further determine local maxima 702, 704 in the actual buffer level N and control the target buffer level L in dependence on both the determined local minima 701, 703 and the determined local maxima 702, 704. For instance, the latency controller 109 may increase the time constant for decreasing the target buffer level L in dependence on the difference between the determined local maxima 702, 704 and the determined local minima 701, 703 increasing. Alternatively, or additionally, the latency controller 109 may increase the target buffer level L in dependence on the difference between the determined local maxima 702, 704 and the determined local minima 701, 703 increasing. The latter could e.g. be accomplished by adding a safety margin value to the target buffer level L before providing it to the ratio controller 105, wherein the safety margin value depends on said difference. The time constant and/or the safety margin value may e.g. be proportional to said difference or otherwise increase when said difference increases and vice versa. The latency controller 109 may determine the difference between local maxima 702, 704 and local minima 701, 703 by tracking the local minima 701, 703 and the local maxima 702, 704 and determine said difference in dependence on low-pass filtered or otherwise smoothed minimum and maximum track values. Instead of using the difference between the determined local maxima 702, 704 and the determined local minima 701, 703 in the above computations, the latency controller 109 may use the difference between the average or smoothed input-buffer level l(t) provided by the estimator 104 and the determined local minima 701, 703, since this difference is highly correlated with the former difference when the ratio controller 105 works as described further above.

The latency controller 109 may use any known methods and/or means to track or otherwise determine the development over time of the local minima 701, 703 and/or the local maxima 702, 704 and may control the target buffer level L in dependence on the determined development. The latency controller 109 may receive a quality signal from the receiver 101 indicating e.g. the frequency of transmission errors, lost packets and/or packet retransmissions etc., and the latency controller 109 may estimate the quality of reception of the digital audio signal based on the quality signal alone or on the quality signal in combination with the methods described above using the actual buffer level N. In any embodiment, the latency controller 109 may further low-pass filter the target buffer level L with an appropriate cut-off frequency before providing it to the ratio controller 105 in order to avoid abrupt changes of the conversion ratio.

Instead of working to minimise the difference between the estimated average or smoothed input-buffer level l(t) and the target buffer level L as described further above, the ratio controller 105 may use a simpler scheme by causing the sample processor 103 to increase the conversion ratio when the difference is below a lower difference threshold and causing the sample processor 103 to decrease the conversion ratio when the difference is above an upper difference threshold. It is assumed that the difference is computed such that it is positive when the estimated average or smoothed input-buffer level l(t) exceeds the target buffer level L; otherwise the logic should be reversed. This simpler scheme corresponds to implementing adaptive latency control in sample-rate conversion using piecewise constant conversion ratios as described further above. Note that when added to the target buffer level L, the upper and lower difference thresholds yield the buffer thresholds described further above. One of the upper and lower difference thresholds may be set to zero, such that the target buffer level L indicates one of the buffer thresholds. Alternatively, the upper and lower difference thresholds may be equal in magnitude but of opposite sign, such that the target buffer level L indicates the middle of the buffer space available between the buffer thresholds. Other combinations of magnitude and sign for the upper and lower difference thresholds are easily contemplated.

In any embodiment, the hearing device 100, 200 is preferably implemented using mainly digital circuits operating in the discrete time domain, but some parts hereof may alternatively be implemented as analog circuits operating in the continuous time domain. Digital functional blocks of the hearing device 100, 200, such e.g. the functional blocks shown in the drawings, may be implemented in any suitable combination of hardware, firmware and software and/or in any suitable combination of hardware units. Furthermore, any single hardware unit may execute the operations of several functional blocks in parallel or in interleaved sequence and/or in any suitable combination thereof.

In any embodiment, the input buffer 102 may preferably be implemented as a ring buffer or as a first-in-first-out (FIFO) buffer.

The hearing device 100, 200 may be part of a binaural hearing system, and the hearing device 100, 200 may e.g. receive the digital audio signal from the other hearing device in the binaural hearing system. The binaural hearing system may comprise one or more auxiliary devices.

Embodiments of the invention may be used in any type of device, and most advantageously in battery-driven and/or portable devices.

Some preferred embodiments have been described in the foregoing, but it should be stressed that the invention is not limited to these, but may be embodied in other ways within the subject-matter defined in the following claims. For example, the features of the described embodiments may be combined arbitrarily, e.g. in order to adapt the system, the devices and/or the method according to the invention to specific requirements.

It is further intended that the structural features of the system and/or devices described above, in the detailed description of 'mode(s) for carrying out the invention' and in the claims can be combined with the methods, when appropriately substituted by a corresponding process. Embodiments of the methods have the same advantages as the corresponding systems and/or devices.

Any reference numerals and names in the claims are intended to be non-limiting for their scope.

REFERENCES

[1] Digital Signal Processing; John G. Proakis and Dimitris K Manolakis; Prentice Hall; 4th edition (Apr. 7, 2006); ISBN 978-0131873742

The invention claimed is:

1. A method for operating a hearing device, the method comprising:

receiving samples of a digital audio signal with an input rate;

feeding received samples as a digital input signal to an input buffer;

processing the buffered samples to provide samples of a digital output signal such that the digital output signal is a sample-rate converted representation of the digital input signal with a predetermined target sample rate, said processing comprising upsampling the buffered samples to provide an upsampled signal and downsampling the upsampled signal;

estimating the quality of reception of the digital audio signal by determining an average input buffer level by counting the number of unprocessed samples in the input buffer;

controlling the processing of the buffered samples in dependence on an estimated quality of reception;

increasing a target buffer level when the estimated quality of reception of the digital audio signal decreases;

decreasing the target buffer level when the estimated quality of reception of the digital audio signal increases;

comparing a parameter representative of a difference between the average input buffer level and the target buffer level, or a speed of variation in the difference between the average input buffer level and the target buffer level, to a predetermined threshold; and controlling a conversion ratio between the input rate and the sample-rate according to one of a first mode and a second mode, which is selected according to a result of the comparison between the parameter and the predetermined threshold, wherein:

in the first mode, the conversion ratio is controlled by performing skip and/or repeat operations in order to minimise the difference between the average input buffer level and the target buffer level, in the second mode, the conversion ratio is controlled by changing an upsampling factor and/or downsampling factor, the first mode is selected for controlling the conversion ratio when the parameter is below the predetermined threshold, and the second mode is selected for controlling the conversion ratio when the parameter exceeds the predetermined threshold thus indicating that the difference between the average input buffer level and the target buffer level is too large or changing too fast to allow minimizing the difference by skip and/or repeat operations.

2. A method according to claim 1, wherein said processing comprises computing each sample of the output signal as a scalar product of a subset of the buffered samples and a subset of filter coefficients, wherein said subsets are selected anew for each computed sample from respectively the input buffer and a set of predetermined coefficients, and wherein the selection of said subset of the buffered samples is made in dependence on the estimated average or smoothed input-buffer level.

3. A method according to claim 1, wherein controlling the processing of the buffered samples comprises proportional-derivative control or proportional-integral-derivative control.

4. A hearing device, comprising:

a receiver, an input buffer and a sample processor, the receiver being adapted to receive samples of a digital audio signal with an input rate and feed received samples as a digital input signal to the input buffer, the sample processor being adapted to process the buffered samples to provide samples of a digital output signal such that the digital output signal is a sample-rate converted representation of the digital input signal with a predetermined target sample rate, said processing comprising upsampling the buffered samples to provide an upsampled signal and downsampling the upsampled signal, wherein the hearing device further comprises a latency controller adapted to estimate the quality of reception of the digital audio signal by counting the number of unprocessed samples in the input buffer and to control the processing of the buffered samples in dependence on the estimated quality of reception, to increase a target buffer level in dependence on the estimated quality of reception of the digital audio signal decreasing, and to decrease the target buffer level in dependence on the estimated quality of reception of the digital audio signal increasing, said hearing device further comprises a ratio controller configured to compare a parameter representative of a difference between the average input buffer level and the target buffer level, or a speed of variation in the difference between the average input buffer level and the target buffer level, to a predetermined threshold, and to control a conversion ratio between input rate and the sample-rate according to one of a first mode and a second mode, which is selected according to a result of the comparison between the parameter and the predetermined threshold, wherein:

in the first mode, the conversion ratio is controlled by performing skip and/or repeat operations in order to minimise the difference between the average input buffer level and the target buffer level, in the second mode, the conversion ratio is controlled by changing an upsampling factor and/or downsampling factor, the first mode is selected for controlling the conversion ratio when the parameter is below the predetermined threshold, and the second mode is selected for controlling the conversion ratio when the parameter exceeds the predetermined threshold thus indicating that the difference between the average input buffer level and the target buffer level is too large or changing too fast to allow minimizing the difference by skip and/or repeat operations.

5. A hearing device according to claim 4, wherein the sample processor is further adapted to compute each sample of the output signal as a scalar product of a subset of the buffered samples and a subset of filter coefficients, to select said subsets anew for each computed sample from respectively the input buffer and a set of predetermined coefficients, and to select said subset of the buffered samples in dependence on the estimated average or smoothed input-buffer level.

6. A hearing device according to claim 5, wherein the sample processor is further adapted to shift said subset of the buffered samples in time in dependence on the estimated average or smoothed input-buffer level.

7. The method according to claim 1, wherein the hearing device being operated is a hearing aid, a listening device, or an active ear-protection device.

8. The hearing device according to claim 4, comprising at least one of:

a hearing aid;

a listening device; and an active ear-protection device.

* * * * *